Sept. 11, 1956 J. O. BURMAN 2,762,554
HINGE AND COMBINATION HINGE AND
BOX REINFORCING STRUCTURE
Filed Dec. 28, 1950 2 Sheets-Sheet 1
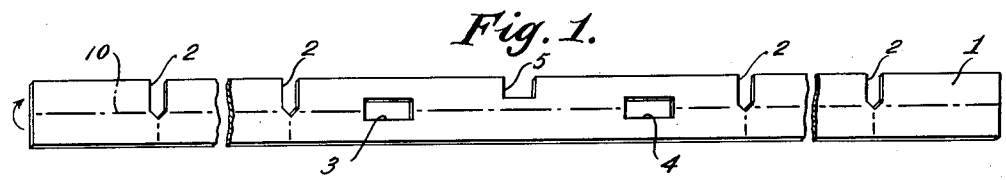
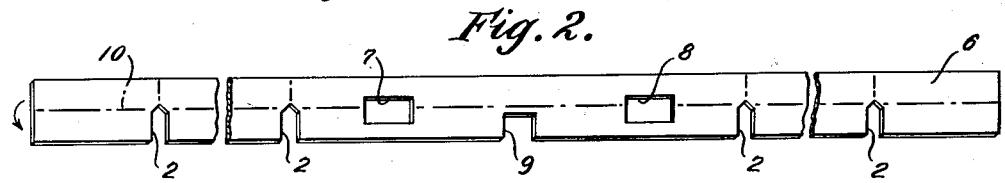
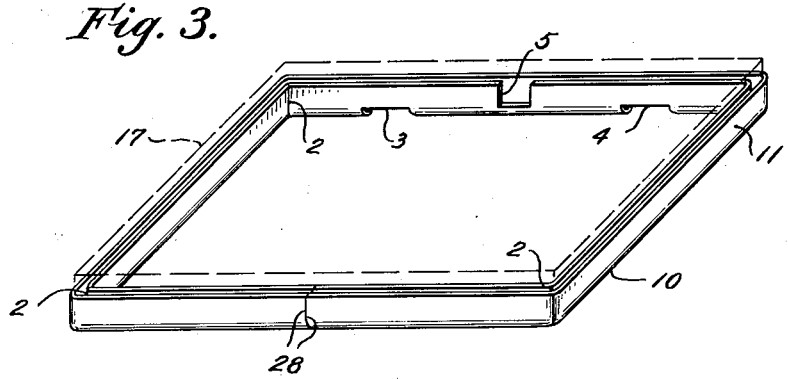
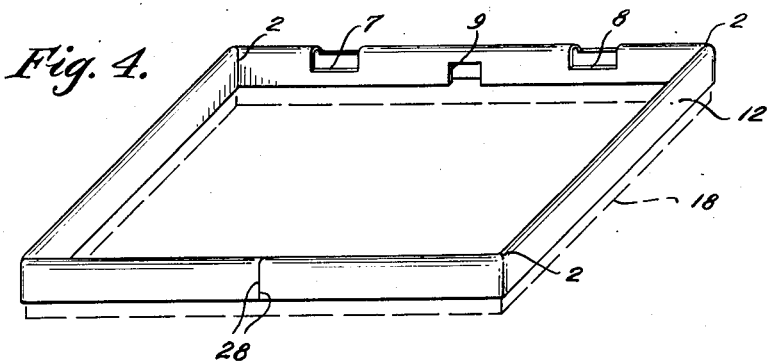
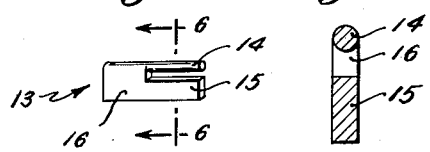
Inventor,
Joseph O. Burman,
by Townsend M. Gunn
Atty.

Sept. 11, 1956　　　　　　　J. O. BURMAN　　　　　　　2,762,554
HINGE AND COMBINATION HINGE AND
BOX REINFORCING STRUCTURE
Filed Dec. 28, 1950　　　　　　　　　　　　　　　　　2 Sheets-Sheet 2
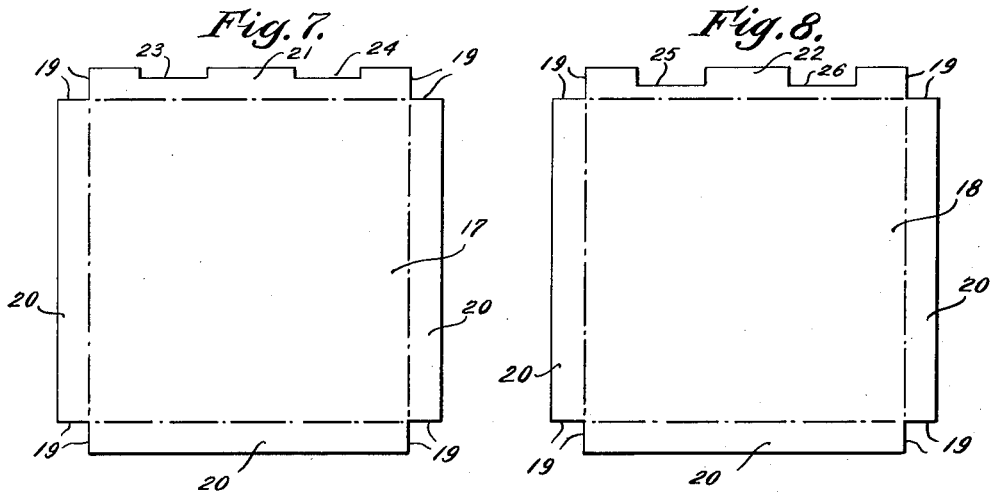
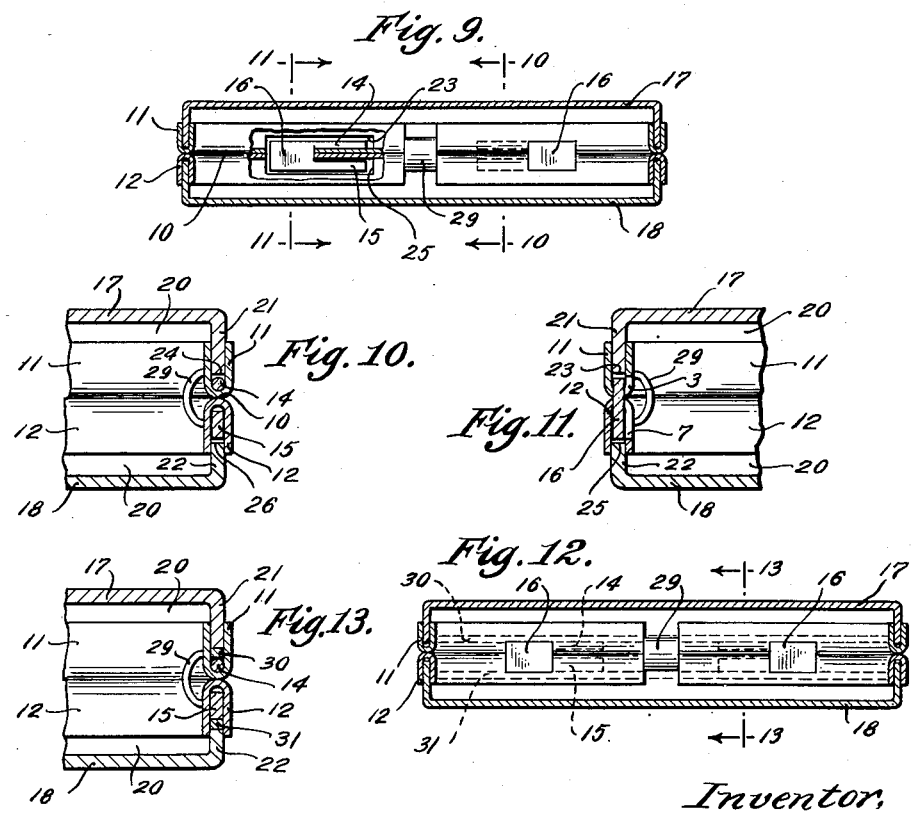
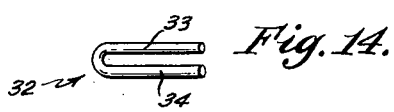
Inventor,
Joseph O. Burman,
by Townsend M Gunn
Att'y.

United States Patent Office 2,762,554
Patented Sept. 11, 1956

2,762,554

HINGE AND COMBINATION HINGE AND BOX REINFORCING STRUCTURE

Joseph O. Burman, Norton, Mass., assignor to A. A. Augat Machine & Tool Co., Inc., Attleboro, Mass., a corporation of Massachusetts Application December 28, 1950, Serial No. 203,064

8 Claims. (Cl. 229—44)

This invention relates to hinge structures and to box reinforcing structures incorporating such hinges. The invention has particular adaptability to boxes made of cardboard or other sheet material having comparatively little strength and stiffness.

Among the several objects of the invention may be noted the provision of a simple hinge structure that may be made in its entirety from punch-press operations; the provision of a hinge of the class described which may be made relatively thin so as not to take up much space; the provision of a hinge of the class described which may be concealed from view; the provision of a combined hinge and box reinforcing structure adapted for reinforcing weak and non-rigid box parts to which it is applied; the provision of a hinge and box reinforcing structure in which the reinforcing structure eliminates the necessity of corner stays on a folded box to which the structure is to be applied; the provision of a structure of the class described which lends itself to being covered with covering means after being assembled on box halves either before or after the box halves are hinged together; the provision of a hinge of the class described in which the respective parts may be hinged together by a separable means in a simple manner without the necessity of using screws or rivets; and the provision of a hinge and/or a combined hinge and box reinforcing structure which is simple and economical to make. Other objects and advantages will be in part obvious and in part pointed out hereinafter.

In the accompanying drawings, in which are illustrated several possible embodiments of the invention:

Figs. 1 and 2 are plan views of sheet metal blanks used for top and bottom halves, respectively, of the box to which they are to be applied;

Figs. 3 and 4 show, respectively, the blanks of Fig. 1 and 2 folded and ready for fitting on box parts;

Fig. 5 is a perspective view of one embodiment of a hinge clip;

Fig. 6 is a section on lines 6—6 of Fig. 5;

Figs. 7 and 8 are box blanks for top and bottom halves, respectively, of a box, prior to folding;

Fig. 9 is an interior view of a section of a closed box with the members of Figs. 3 and 4 applied thereto with the clip of Fig. 5 inserted to hinge the parts together;

Fig. 10 is a section on lines 10—10 of Fig. 9.

Fig. 11 is a section on lines 11—11 of Fig. 9.

Fig. 12 is a view similar to Fig. 9, but of a modified hinge structure;

Fig. 13 is a section on lines 13—13 of Fig. 12; and

Fig. 14 is a perspective view of a modified hinge clip.

Similar reference characters indicate corresponding parts throughout the drawings.

In the box making art, particularly in boxes used for packaging and display purposes in the jewelry industry, difficulty has been experienced in obtaining a low-cost hinge structure and in fastening the hinge to the box. Also difficulty has been experienced, in boxes of weak material, in providing adequate and satisfactory snap-springing to keep the box open or closed. In many cases, the boxes are made of relatively thin cardboard for economy, and the lack of rigidity and strength of the sides of such a box presents a serious hinge-attachment problem.

In addition to this, it is desirable in many instances to be able to cover with decorative material both the top and bottom of the box, in some cases before the halves are hinged together, and in other cases after the hinging has been done. Also, in order to avoid unsightly bulges resulting from the use of ordinary butt-type hinges, it is desirable to have the hinge concealed within the walls of the box as much as possible.

It is the general purpose of this invention to provide a hinge structure and a combined hinge and reinforcing structure that solves the above problems in a novel and useful way.

Basically, the present invention involves four parts; a U-shaped metal channel structure into which the wall of the cover of the box may fit; a corresponding U-shaped channel member into which the wall of the bottom of the box may fit; and at least one separately insertable (and removable if desired) hinge clip which incorporates the hinge pintle. Reference to the drawings will show the manner in which these are made.

Referring now to Fig. 1, there is indicated by numeral 1 a flat strip of sheet metal blanked out on a punch press. Corner notches 2 are provided, as well as pintle openings 3 and 4. An additional notch 5 is provided for engagement by a snap spring as will be later described. In a similar fashion, a second strip of metal 6 is provided, having corner notches 2, hinge clip openings 7 and 8, and snap spring notch 9.

It will be observed that openings 3 and 4 are spaced (laterally) equally on the fold line 10, while openings 7 and 8 are displaced laterally of the fold line.

Each of strips 1 and 6 is bent or folded lengthwise approximately along the broken fold line 10 to form preferably a U-shaped channel member. The bight of the U should preferably be rounded for best operation of the completed hinge, at least in the hinge bearing areas, as indicated in Figs. 10, 11 and 13, but may be flat if desired. The resulting U-shaped channel members are then bent transversely at the notches 2 to form the frames 11 and 12 shown in Figs. 3 and 4 respectively, notches 2 providing relief for this purpose. It will be observed that in folding the frame 12, the folding is done so that the openings 7 and 8 come on the inside of the frame.

Referring now to Figs. 5 and 6, there is shown by numeral 13 a hinge clip stamped from sheet metal, preferably of a thickness equal to or slightly less than the thickness of the material used for making the box parts later to be fitted into the U-channels. Clip 13 has two legs indicated by numerals 14 and 15 and a body portion 16. Leg 14 is preferably made round in cross-section and forms the pintle of the hinge. Leg 15 may be termed the anchor leg and in this instance is substantially broader than it is thick. Body portion 16 is of a size to fit into openings 7 or 8.

Figs. 7 and 8 show cardboard cut-outs 17 and 18 which may be used with frames 11 and 12, respectively, to complete the box. It is to be understood that the above-described U-channel is of a width to snugly receive the thickness of the cardboard of cut-outs 17 and 18. As usual, each of the cut-outs is provided with corner notches 19, to form side walls 20, 21 and 22. The cut-outs are to be folded on dotted lines 23 in usual fashion to provide the top and bottom of the box-to-be. Wall 21 is provided with notches 23 and 24 which are so placed that when the four walls of top 17 are inserted in the U-channel provided by frame 11, notches 23 and 24 will register with and provide clearance for openings 3 and 4. It will be noted that notches 23 and 24 are longer than openings 3 and 4, in order to provide accommodations for pintle 14. Similarly, wall 22 is provided with notches 25 and 26 which will register with openings 7 and 8 when the four walls of box bottom 18 are inserted in the U-channel of frame 12. Again, notches 25 and 26 are made longer than openings 7 and 8 in order to accommodate anchor leg 15 of hinge clip 13. It will also be noted that the openings 3 and 4, and 7 and 8, are preferably placed so that when the channels are folded on the fold line 10, the respective openings occur almost entirely on what will become the inner wall of each channel. However, if desired, the openings may be so placed so as to come on what will be the outer wall; or, if desired, the openings may be spaced laterally so as to come equally on the front and back walls.

One of the advantages of the invention may now be pointed out as follows: It has been customary to use corner stays to hold the corners of the cut-outs 17 and 18 together when the side walls have been bent to form the respective box top and bottom. In the present invention, such corner-staying is unnecessary, the frames 11 and 12 holding the walls and corners securely in their proper relationship. It is also to be noted that the engagement of the frames 11 and 12 with the walls 20, 21 and 22 is such that said walls hold the abutting ends 27 and 28 of each frame together. Of course, if desired, after the cut-outs are inserted, ends 27 and 28 may be prick-punched or staked against the enclosed wall, for a more secure fastening.

As indicated above, cut-out 17 is inserted in frame 11, and cut-out 18 is inserted in frame 12, to form the box top and box bottom. If top and bottom are to be covered with decorative fabric or covering material, if desired this may be done at this stage or later. In covering, the covering material where it bends around the U-edge of the frames should be cut away to leave access to openings 3, 4, 7 and 8. Or covering may wait, if desired, until the frames are hinged together, which will now be described.

The frames (preferably with cut-outs 17 and 18 inserted), are placed together with notch 3 in register with notch 7, and notch 4 registering with notch 8. Hinge clips are now inserted in the combined openings 3—7 and 4—8 with pintle 14 sliding into the recess provided between the edge of the material of notch 23 and the bight of frame 11, and similarly as to notch 24. The anchor leg 15 slides in each case into the recess provided between the edge of the material of notch 25 and the bight of frame 12, and similarly as to notch 26.

Reference to Figs. 9, 10 and 11 show this, wherein the dotted lines indicate respectively in each case the pintle 14, and anchor leg 15 inserted in place. It will be noted that after being inserted, the hinge clips are held in place by their own configuration and in fact, it will be found that they will tend to snap into place on being slid into their respective openings. However, if desired, the anchor legs may be spot welded or staked or otherwise fastened to the frame 12 for further security.

If desired, the usual type of C-shaped snap spring 29 may be clipped in place to engage the edges provided by notches 5 and 9 in frames 11 and 12, thus providing means to hold the cover of the completed box in either open or closed position.

If the material used for the cut-outs 17 and 18 is particularly weak and soft, it may be desirable to place a wear resisting means between the pintle 14 and the material of notches 23 and 24, and similar means between anchor leg 15 and the material of notches 25 and 26. This is indicated in Figs. 12 and 13 wherein numeral 30 indicates a strip of metal or some other wear resisting material the thickness of the cut-out material which has been inserted between the cut-out material forming the back-wall (or hinged wall) of the box and the pintles 14. Similarly 31 indicates a strip of metal or wear-resisting material likewise inserted in the bottom part of the box. As drawn, the strips 30 and 31 do not have notches cut in them, so that they rest against pintles and anchor-legs respectively, with the walls 21 and 22 respectively resting snugly against strips 30 and 31, the edges of these walls not being notched since there is no necessity for notching. If desired, however, the proper respective edges of strips 30 and 31 may be notched as were walls 21 and 22 to provide greater reinforcement.

In some cases, it may be desired to use a hinge clip having a smaller anchor leg so as not to have to use as large openings 7 and 8. In this case, there is provided in Fig. 14 a hinge-pin 32 formed of wire, having the pintle 33 and anchor leg 34 the same size. Such a hinge-clip can be made on automatic machinery at little cost. With such a hinge-clip the openings 3, 4, 7 and 8 may all be of the same size and considerably smaller than they need be for hinge clip 13. The parts of the box may be assembled as before, the bight of clip 32 fitting into the recess provided by registration of the respective hinge clip openings. After the hinge clips 32 have been inserted in the manner described above for the clips 13, it may then be desirable to spot-weld, stake or otherwise fasten anchor leg 34 into the bight of the U-channel of reinforcing frame, to hold it in an upright position and thus hold top and bottom parts of the box in register when closed.

In some cases, it may not be necessary or desired to have the frames 11 and 12 extend all around to box walls 20, 21, and 22. For example, it may be that the cut-out material is stiff enough and strong enough so that such reinforcement is not necessary. In that event all that will be desired is a hinge structure and this can be provided by that portion of the frames which has been notched to receive the hinge clips, the frames then comprising single lengths of U-channel notched as aforesaid and fitting over the back walls 21 and 22 of the box parts. The U-channel may be affixed to the said walls by staking, riveting, glueing, or by other suitable means.

It is also to be noted that while the drawings show only two hinge clips being provided, yet more than two may be provided if the added hinge strength is desirable and the length of the hinged walls is such as to permit more than two clips. In the event the box is one having very short or narrow walls 21 and 22, then only one hinge clip may be used.

In view of the above, it will be seen that the several objects of the invention are achieved and other advantageous results attained.

As many changes could be made in the above construction without departing from the spirit of the invention, it is intended that all matter contained in the above description or shown in the accompanying drawings shall be interpreted as illustrative and not in a limiting sense.

I claim:

1. A hinge comprising two leaves pivotally connected together, and at least one means separately and removably insertable within the bodies of said leaves for pivotally connecting said leaves, each of said leaves being at least in part channel shaped, the bight and a portion of a side wall of each channel being provided with at least one opening in register with an opening provided in the other channel, said openings being positioned between the ends of each of said leaves, each of said means comprising a pintle portion and an anchor portion fastened together in substantially parallel relationship, said pintle portion being inserted in an opening in one of the channels and lying within the channel, and said anchor portion being inserted in the opening of the other channel which lies in register with the opening in which said pintle portion is inserted, and lying within the channel, said insertable means lying between the ends of said leaves, and said pintle and anchor portions being concealed within said leaves.

2. The hinge of claim 1 in which each of said means comprises a two-legged member, one of whose legs constitutes the pintle portion and lies within one of said channels adjacent its bight, and the other of whose legs constitutes the anchor portion and lies within the other of said channels adjacent its bight.

3. A hinge comprising two leaves pivotally connected together, and at least one separately insertable means for pivotally connecting said leaves, each of said leaves being at least in part channel shaped, the bight and a portion of a side wall of each channel being provided with at least one opening in register with a similarly provided opening in the bight and side wall of the other channel, the opening in the side wall of one channel being the same length as, but narrower than, the registering opening in the side wall of the other channel, each of said means comprising a U-shaped member one of whose legs is relatively narrow and is adapted to fit through the narrower of said openings, the other of whose legs is relatively wide and is adapted to fit through the wider of said openings, said narrow leg acting as the pintle for the hinge, and said wide leg acting as an anchor leg to hold said means in position in said channels, said narrow and wide legs being concealed within said leaves.

4. A combination hinge and reinforcing structure for a box having top and bottom parts each having walls, comprising two channel shaped frames each being folded to fit over the edges of the walls of each of the box top and bottom and to encompass the corners of the box walls, said frames being pivotally connected together, and at least one separately and removably insertable means for pivotally connecting said frames, the bight and a portion of a side wall of the channel of each frame being provided with at least one opening in register with a similarly provided opening in the bight and side wall of the channel of the other frame, each of said means comprising a pintle portion and an anchor portion fastened together in substantially parallel relationship, said pintle portion being inserted through one of said openings and into the channel of one of said frames and being adapted to lie between the bight of the channel and the edge of the wall over which the channel fits and said anchor portion being inserted through a registering opening and into the channel of the other of said frames and being adapted to lie between the bight of the channel and the edge of the wall over which the channel fits, said pintle and anchor portions being concealed within said frames.

5. The structure of claim 4 in which said means comprises a U-shaped member one of whose legs constitutes said pintle portion, and the other of whose legs constitutes said anchor portion.

6. The structure of claim 4 in which said means comprises a U-shaped member having a narrow leg and a broad leg, said narrow leg constituting said pintle portion, and said broad leg constituting said anchor portion.

7. A combination hinge and reinforcing structure for a box having a top and bottom part each having at least a back wall, comprising two channel shaped frames each being folded to fit over the edges of at least a portion of the walls of said box, said frames being pivotally connected together, and at least one means for pivotally connecting said frames, each of said means comprising a pintle portion and an anchor portion, the bight and a portion of the side wall of the channel of each of said frames being provided with openings adapted to receive said pintle portion and said anchor portion, said pintle portion and said anchor portion lying, respectively, along the bight of its associated channel, and reinforcing means lying within the channel and between said pintle portion and the edge of the box wall over which its associated channel fits.

8. The structure of claim 7 in which said reinforcing means comprises a strip of material more wear-resistant than the material of the wall of the box and substantially the same thickness as the wall of the box.

References Cited in the file of this patent

UNITED STATES PATENTS

| | | |
|---|---|---|
| 10,334 | Cantel | Dec. 20, 1853 |
| 463,126 | Geiss | Nov. 10, 1891 |
| 1,070,194 | Shine | Aug. 12, 1913 |
| 1,074,815 | Prior et al. | Oct. 7, 1913 |
| 1,537,562 | Stock | May 12, 1925 |
| 1,552,916 | Farrington | Sept. 8, 1925 |
| 1,627,584 | Tishken | May 10, 1927 |
| 1,691,468 | Cooper | Nov. 13, 1928 |
| 1,984,934 | La Duke | Dec. 18, 1934 |